Feb. 6, 1962 L. P. GARVEY ET AL 3,019,848
VACUUM-OPERATED COINCIDENTAL DOOR LOCK CONTROL SYSTEM
Filed Oct. 1, 1958 5 Sheets-Sheet 1

INVENTORS
Louis P. Garvey &
James D. Leslie
BY William S. Pettigrew
ATTORNEY

Feb. 6, 1962     L. P. GARVEY ET AL     3,019,848
VACUUM-OPERATED COINCIDENTAL DOOR LOCK CONTROL SYSTEM
Filed Oct. 1, 1958     5 Sheets-Sheet 3
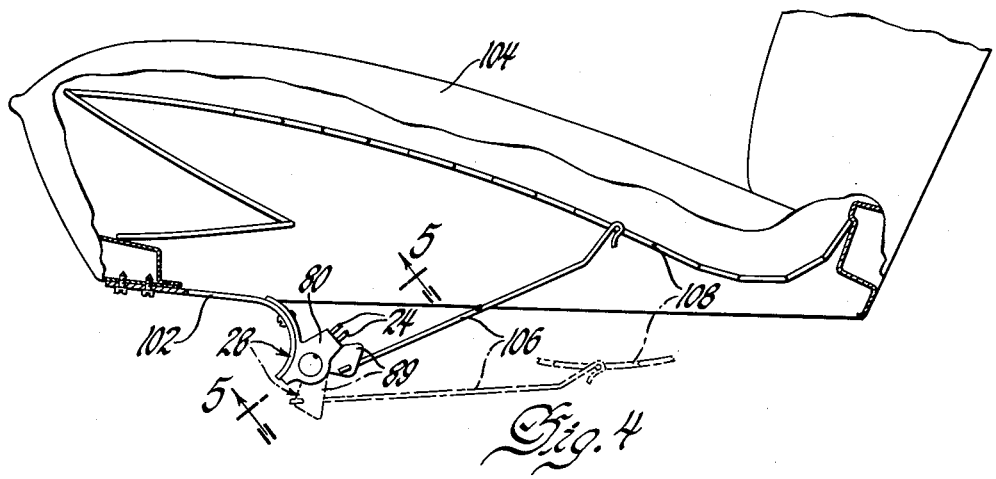
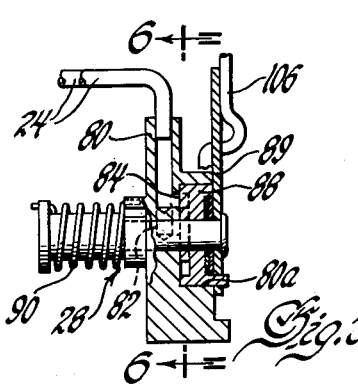
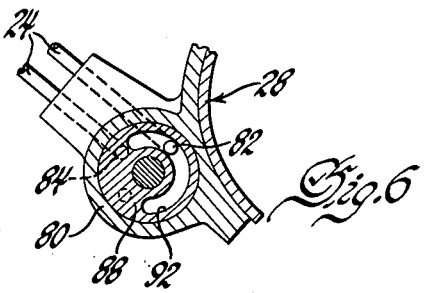
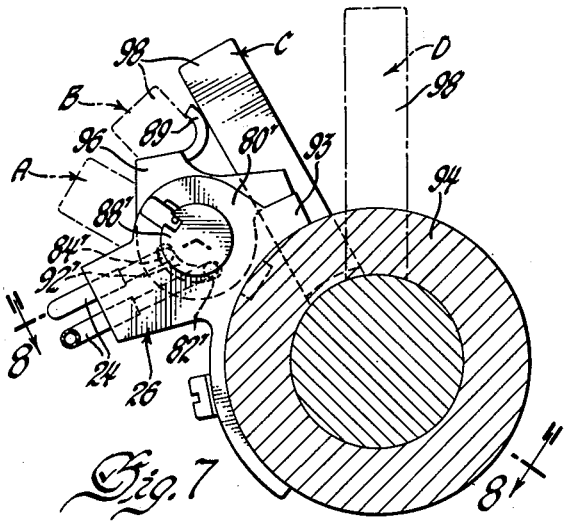
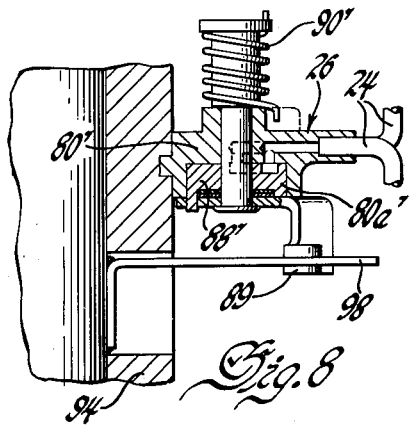
INVENTORS
Louis P. Garvey &
James D. Leslie
BY William S. Pettigrew
ATTORNEY

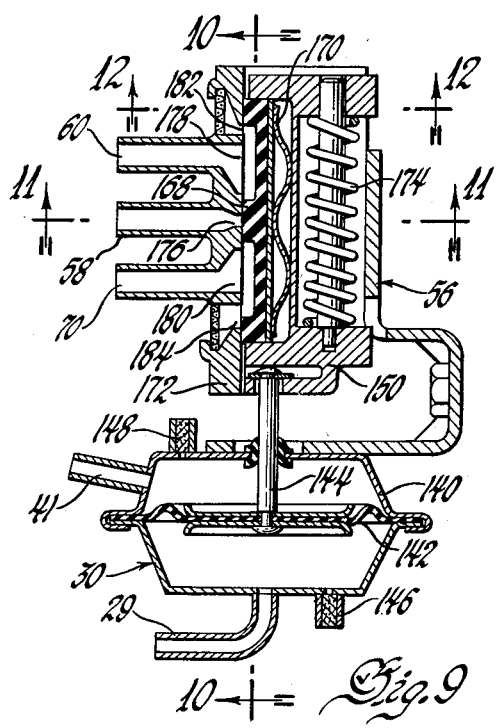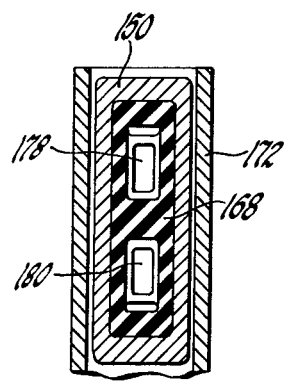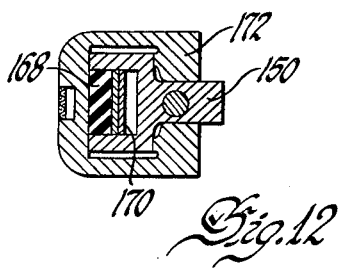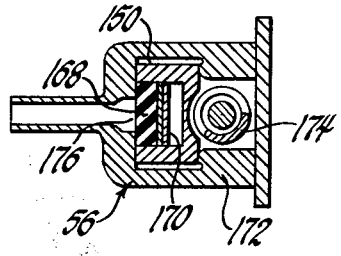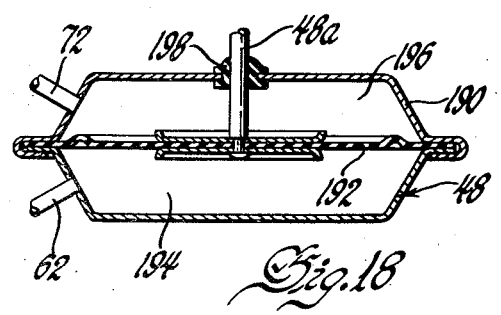

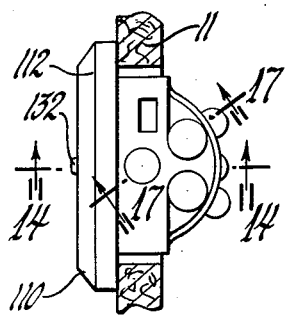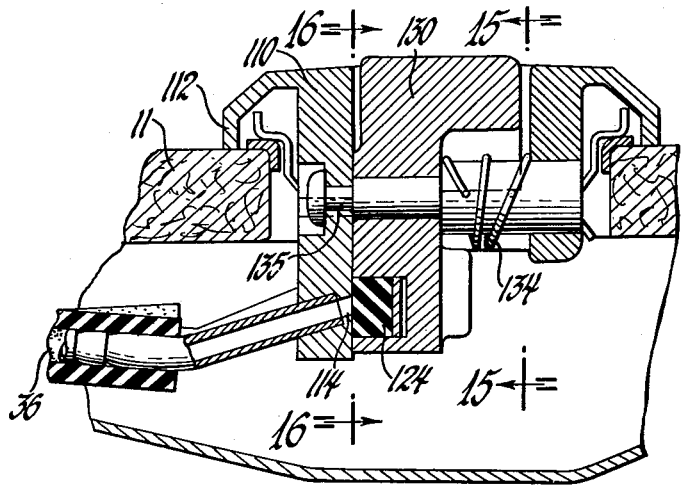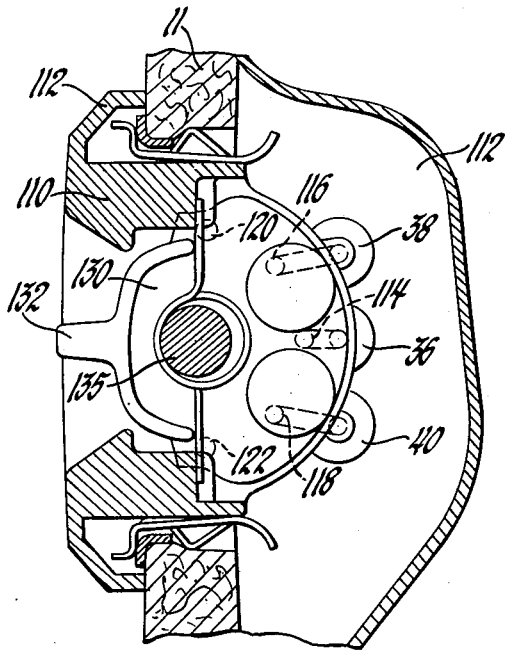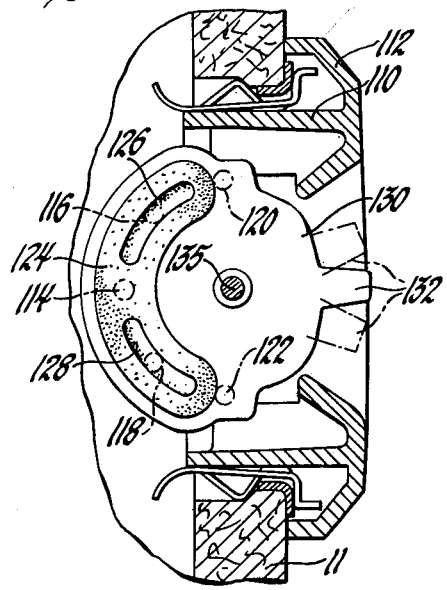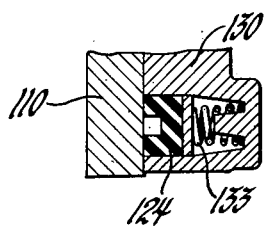

United States Patent Office 3,019,848
Patented Feb. 6, 1962

3,019,848
VACUUM-OPERATED COINCIDENTAL DOOR
LOCK CONTROL SYSTEM
Louis P. Garvey and James D. Leslie, Birmingham, Mich., assignors to General Motors Corporation, Detroit, Mich., a corporation of Delaware
Filed Oct. 1, 1958, Ser. No. 764,662
4 Claims. (Cl. 180—82)

This invention relates to a door lock control system, and more particularly to a vacuum-operated door lock control system for an automobile.

One feature of the invention is that it provides an improved door lock control system which operates through fluid pressure differential means; another feature of the invention is that it provides a novel vacuum-operated door lock control system for an automobile; a further feature of the invention is that it provides a door lock control system so constructed and arranged that when the engine is operating, the automobile transmission selector lever is in drive position and the driver's seat is occupied, the automobile doors are locked and are held in locked condition by fluid pressure differential operated means; and still another feature of the invention is that it provides a door lock control system operable by fluid pressure differential relative to ambient pressure and including a fluid supply circuit for connecting the lock operator of each door latch to a source of fluid pressure differential and a fluid control circuit including at least one normally closed valve controlled by a condition of operability of the automobile.

Other features and advantages of the invention will be apparent from the following description and from the drawings, in which:

FIG. 4 is a fragmentary view, partly in section, through the front seat of the automobile of FIG. 1, showing a portion of the door lock control means, the structure being shown in solid lines in its normal valve-closed position and in broken lines in valve-open position;

FIG. 5 is an enlarged section taken along the line 5—5 of FIG. 4 through the control valve of FIG. 4;

FIG. 6 is a section through the line 6—6 of FIG. 5;

FIG. 7 is a section through the steering column of the automobile of FIG. 1, the transmission selector lever being shown in a plurality of different portions;

FIG. 8 is a section taken along the line 8—8 of FIG. 7 and showing the control valve of FIG. 7;

FIG. 9 is a longitudinal section through the remote control valve and actuator of the door lock control system;

FIG. 10 is a detail section through the remote control valve taken along the line 10—10 of FIG. 9;

FIG. 11 is a transverse section through the valve of FIG. 9, being taken along the line 11—11 thereof;

FIG. 12 is a transverse section through the valve of FIG. 9, being taken along the line 12—12 thereof;

FIG. 13 is a transverse section through a portion of the front door inner panel of an automobile showing the manual operator;

FIG. 14 is a section taken along the line 14—14 of FIG. 13;

FIG. 15 is a section taken along the line 15—15 of FIG. 14;

FIG. 16 is a section taken along the line 16—16 of FIG. 14;

FIG. 17 is a detail section taken along the line 17—17 of FIG. 13; and

FIG. 18 is a section through one of the lock operating devices.

This invention provides a door lock control system adapted particularly for use in an automobile and operating from a source of fluid pressure differential relative to ambient pressure. In its preferred embodiment, the invention utilizes vacuum which may readily be drawn from the engine manifold. The system incorporates safety features in that when the engine is running, when the transmission selector is in a drive position, and when the driver's seat is occupied, a fluid pressure differential is applied to fluid pressure controlled operating means connected to the locking member of each door latch so that all the doors are automatically locked and are held locked against manual operation. There is also a manual control means available whenever the automatic locking means is inoperative preferably comprising two similar control devices, one accessible to the driver and the other accessible to the front seat passenger, for manually locking and unlocking the doors. This manual control means is not connected directly to the engine manifold but is connected to a storage source of fluid pressure differential so that it can be operated when the engine is not running.

While in the preferred embodiment of the invention vacuum is used to operate the system, it will be understood that the system could operate just as well on positive fluid pressure since the only requirement is that there be a source of fluid pressure differential relative to ambient pressure. In this specification, whenever the word "vacuum" is used, it will be understood that it is not intended as a word of limitation but rather is intended as being descriptive of the particular embodiment of the invention illustrated, and it will be understood that the invention contemplates the use of fluid pressure differential whether that differential be positive pressure or vacuum.

Figure 1:
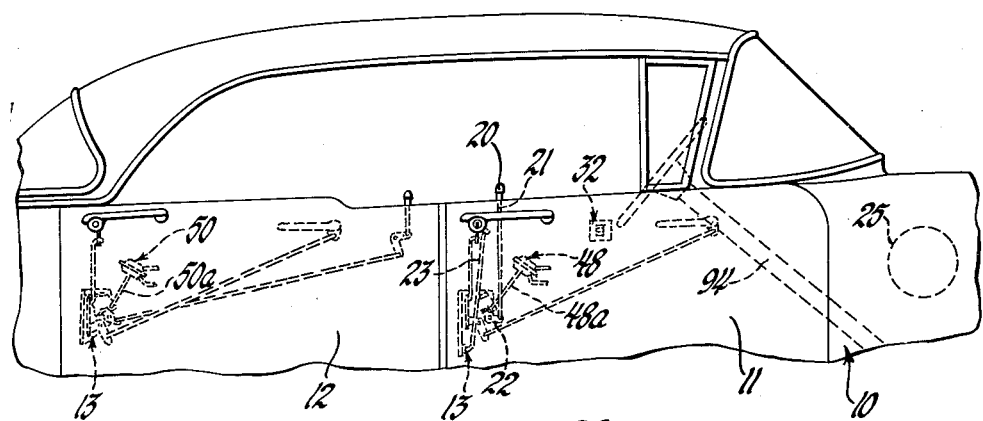
FIG. 1 is a fragmentary side elevational view of an automobile incorporating the improved door lock control system.
Figure 2:
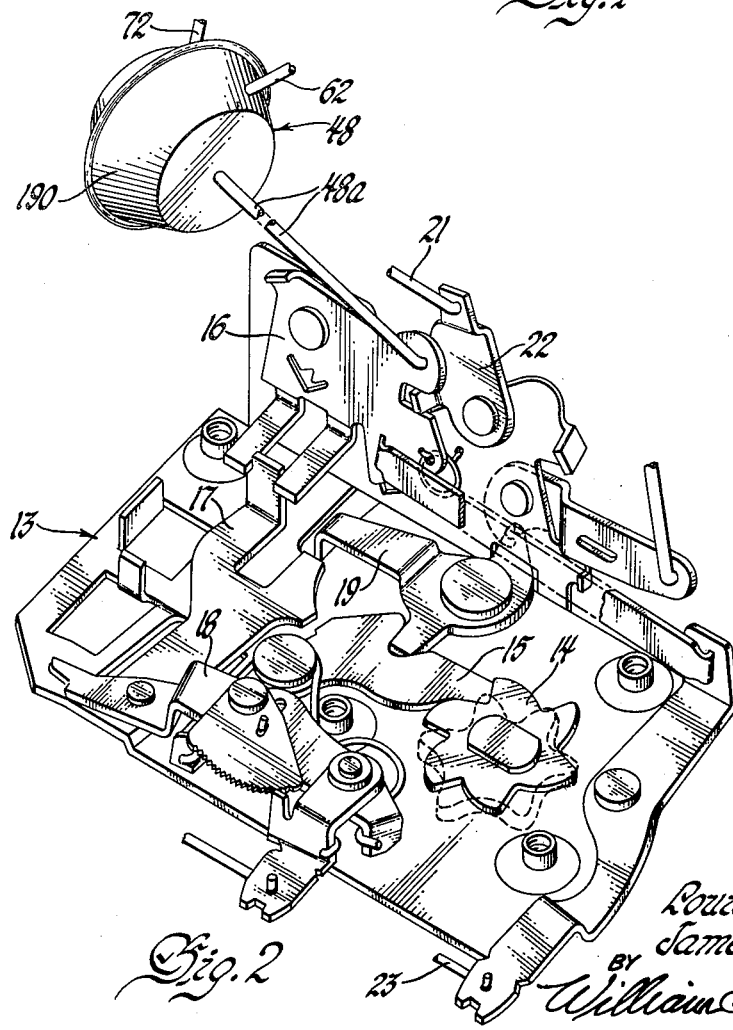
FIG. 2 is an enlarged isometric view of one of the door latches removed from the door of the automobile shown in FIG. 1.

Referring now more particularly to the drawings, an automobile designated generally as 10 has a front door 11 and a rear door 12. On the opposite sides of the body similar front and rear doors are provided. Each door is equipped with a door latch designated generally as 13. While various known forms of door latch may be utilized with the invention, a suitable latch is shown in the patent to Priestman No. 2,832,626, entitled "Door Latch—Adjustable Linkage for Push Button." In the latch of the Priestman patent, which latch also is illustrated in FIG. 2 herein, there is a rotary bolt and ratchet unit 14 which is held by a detent 15 against rotation in one direction. The bolt cooperates with a striker on the automobile body in conventional manner to hold the door closed. In order to open the door, the detent is swung out of engagement with the bolt to permit free rotation of the bolt in a door opening direction. The latch carries a locking member 16 which is pivoted on the lock frame and is movable between locked and unlocked positions and which is connected to outside detent operating means including an intermittent link 17 and a push button operated lever 18. When in unlocked position, the intermittent link is coupled to the detent through a multiplier lever 19. When the locking member 16 is swung (counterclockwise) to locked position, the intermittent link is uncoupled from the multiplier lever 19 so that the outside push button, the lever 18, and the intermittent link 17 merely "free wheel" without moving the detent.

The locking member may be swung between its locked and unlocked positions by means of a conventional inside garnish molding button 20 which is connected to the locking member by means of a rod 21 and motion transfer lever 22, and (in the front door only) by means of an outside operated conventional key operated lock device 23.

For greater detail regarding the construction and operation of the latch 10, reference may be had to Priestman Patent 2,832,626. The novel lock control system of this invention includes a fluid pressure controlled operating device connected to the locking member 16 of each door latch 13 effectively in parallel with the garnish molding connection and with the key lock connection so that no modifications of a conventional door latch, as the Priestman door latch, are necessary to adapt it for use with this lock control system.

Figure 3:
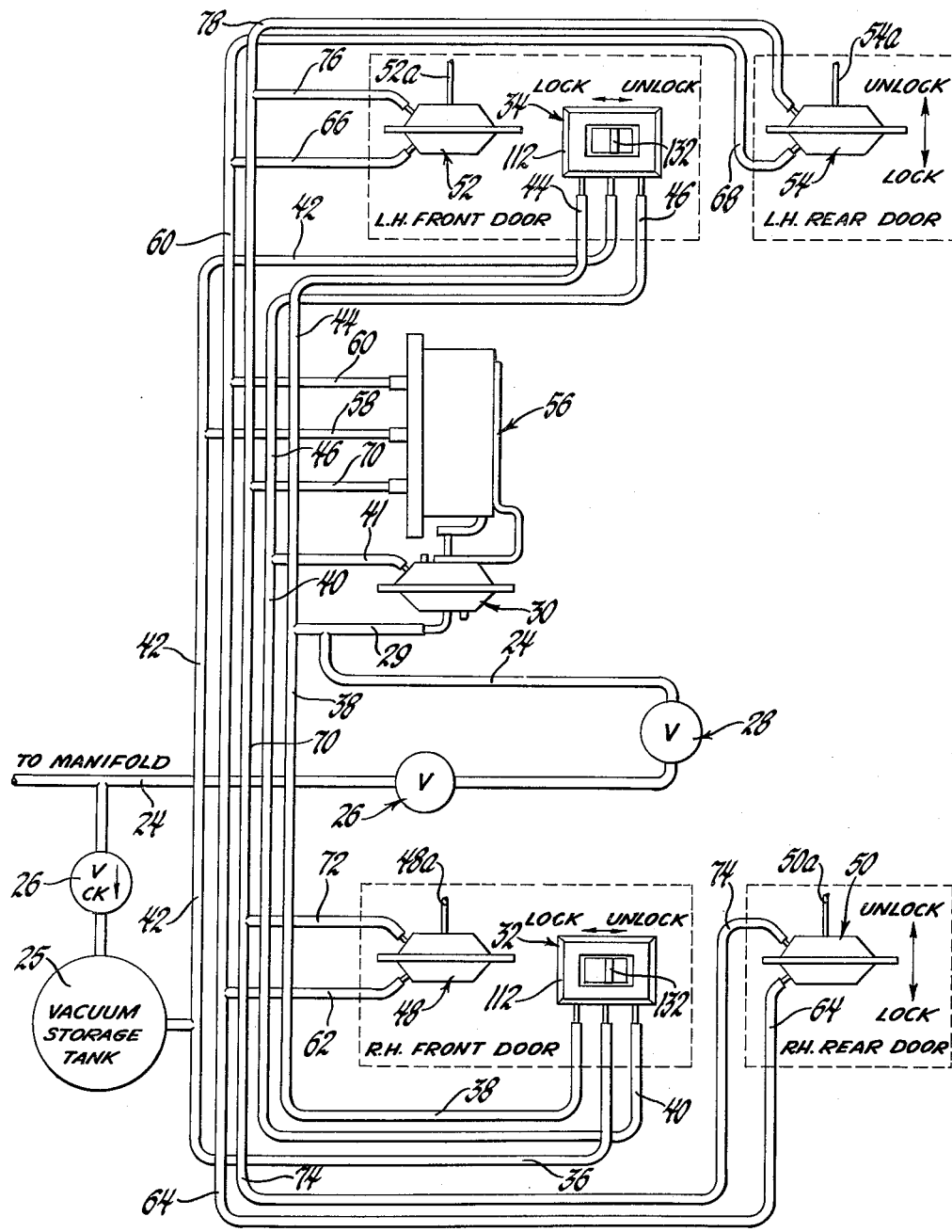
FIG. 3 is a diagrammatic representation of the novel door lock control system.

FIG. 3 shows diagrammatically the construction and arrangement of the novel lock control system. A fluid line 24 connects with the automobile engine manifold in a well known manner so that whenever the automobile engine is operating, a vacuum is drawn in this line. A vacuum storage tank 25 is connected through a check valve 26 to the line 24 to provide a source of vacuum which is available when the engine is not running. The manifold line 24 incorporates in series a normally closed shift valve designated generally as 26 (see FIGS. 7 and 8 for details) and a normally closed seat valve designated generally as 28 (see FIGS. 4, 5 and 6 for details). The line 24 terminates in a connection with a connector line 29 leading to the locking side of a fluid pressure operated actuating device designated generally as 30 (see FIG. 9 for details).

In general parallel relationship with the elements described above and, together with these elements forming a fluid control circuit, are two manual selector devices designated respectively as 32 and 34 (see FIGS. 13–17 for details). The selector device 32 is connected by a vacuum line 36 to the vacuum storage tank 25. In the locking control circuit a line 38 connects the selector device 32 with the connector line 29 in the locking side of the actuating device 30. In the unlocking control circuit, the manual selector 32 is connected by a fluid line 40 to a connector line 41 in the unlocking side of the actuating device 30. Similarly, a line 42 connects the manual selector device 34 with the vacuum storage tank 25, and locking and unlocking control lines 44 and 46 connect the device 34 respectively with the locking and unlocking sides of the actuating device 30.

In each door there is a fluid pressure controlled operating device connected to the locking member of the door latch. The system illustrated here is adapted for use with a four-door automobile and the four operating devices are designated by the reference characters 48, 50, 52, and 54, respectively. Each of these operating devices is similar to the other and each is connected to the operating member of one of the door latches by means of rods 48a, 50a, 52a, and 54a, respectively. The operating devices are connected in parallel to the source of vacuum by a fluid supply circuit incorporating a remote control valve designated generally as 56 and shown in FIGS. 9–12. A fluid supply line 58 connects the remote control valve 56 to the line 42, which in turn leads to the vacuum storage tank 25. The locking side of the remote control valve 56 is connected to a fluid supply line 60 which has branch lines 62, 64, 66, and 68 leading to the locking side of the respective operating devices 48, 50, 52, and 54. The unlocking side of the remote control valve 56 is connected to a fluid supply line 70 which has branches 72, 74, 76, and 78 leading to the unlocking side of the respective operating devices 48, 50, 52, and 54.

Before proceeding with a description of the operation of the door locking system, an explanation of the construction of the control valves and operating devices will be given. The seat valve 28, which is shown in FIGS. 5, 6, and 9, has a valve body 80 with inlet and outlet ports 82, 84 for connection in the vacuum line 24. A sealing member 88 is seated for rotary movement in a recess 80a in the valve body and is biased by a torsion spring 90 toward an open position wherein an arcuate valve opening 92 in the sealing member connects the inlet and outlet ports 82 and 84. Rotation of the sealing member beyond open position is blocked by stop lugs on the sealing member and valve body. An operating lever 89 is connected to the sealing member 88. The seat valve 28 is mounted on the front seat frame 102 at the driver's side beneath the seat cushion 104 and the lever 89 is connected by a wire link 106 to the seat spring 108. With the seat in its normal unoccupied position, the valve is held closed by the seat spring 108. The weight of a seat occupant depresses the seat cushion 104 and the seat spring 108, swinging the connecting link 106 downwardly as shown in broken lines in FIG. 4 so that the torsion spring 90 on the valve opens the valve.

The shift valve 26 is of the same internal construction as the seat valve 28 described above, and the same reference characters with the addition of a prime (') are used to indicate corresponding parts. The valve body 80' is mounted on the steering column 94 by an integral mounting extension. An actuating extension 96 projects from the sealing member 88' and is formed with a hook-shaped pick up 89 against which the transmission selector lever 98 of the automobile abuts. When the transmission selector lever is in park or neutral position (A or B in FIG. 7), it holds the valve closed against the force of the torsion spring 90'. As the transmission selector lever is moved from park or neutral to drive position (C in FIG. 7), the spring 90 causes the sealing member 88 to turn sufficiently that the arcuate valve opening 92' in the sealing member 88' provides communication between the inlet and outlet ports 82', 84' in the valve body. Further rotation of the sealing member is prevented by the stop lug 93 so that if the transmission selector lever is moved into its low drive position (D in FIG. 7), the valve stays open.

One of the manual selector devices is shown in FIGS. 13–17. Each of these devices comprises a normally closed spring-biased two-way valve with a momentary contact finger button actuator. There is a valve body 110 including a framing escutcheon 112 which may be mounted on a panel of one of the front doors 11. The valve body has a center port 114 which is connected to the fluid line 36 and which is flanked on one side by a locking port 116 connected to the locking line 38 and on the other side by an unlocking port 118 connected to the unlocking line 40. Atmospheric ports 120 and 122 are spaced respectively from the locking port 116 and the unlocking port 118. The valve is an arcuate rubber member 124 having arcuate connector ports 126 and 128. The member 124 is carried on and turns with an actuator 130 having a finger operating portion 132 projecting out of the valve body. A spring 133 urges the member 124 against the valve body and a stub shaft 135 rotatably mounts the actuator 130. A return spring 134 holds the valve in its normal center position in which the vacuum inlet line 36 is blocked off by the rubber valve 124. When the finger operating portion 132 is moved in one direction, the inlet port 114 is connected to the locking port 116, and at the same time, the unlocking port is connected to atmosphere by the port 122. When finger pressure is removed, the spring 134 moves the valve back to its normal closed position. Similarly, when moved in an unlocking direction, the inlet port 114 is connected to the unlocking port 118 and the locking port is vented to atmosphere by port 120.

Since each of the manual locking devices 32, 34 is only a momentary contact device, that is, is only in open position so long as finger pressure is applied to, it is necessary to provide a dashpot or relay in the supply circuit to assure continued application of fluid pressure differential for a long enough time to exhaust the lines which lead to each of the four doors. If a dashpot or relay action of this type were not incorporated in the system, the use of a momentary contact manual operator would be unreliable since there would be no assurance that the operator would be held in operating position long enough to exhaust all the lines and lock or unlock all the doors. This dashpot effect is achieved by the actuating device 30 which controls the remote control valve 56.

As shown in FIG. 9, the actuating device merely comprises a housing 140 in which is clamped a flexible diaphragm 142 carrying an actuating rod 144 which is connected to the remote control valve 56. The locking side of the actuating device is connected to the line 29 and is provided with a small atmospheric port 146. The unlocking side of the actuating device is connected to the line 41 and is provided with a small atmospheric port 148. When vacuum is applied to the locking side of the device through the line 29, the diaphragm is pulled down (FIG. 9), shifting the rod 144 (which is connected to the remote control valve 56) downwardly. When vacuum is applied to the unlocking side of the actuator through the line 41, the diaphragm is pulled upwardly from the position illustrated in FIG. 9.

The rod 144 is connected to a sliding carriage 150 in the remote control valve 56. This carriage mounts a slotted sealing member 168 which is biased by a spring 170 into sealing sliding engagement with the valve body 172. A two-way acting centering spring 174 exerts a force tending to return the carriage to its neutral center position.

The valve body 172 is provided with a center port 176 connected to the supply line 58, a locking port 178, an unlocking port 180, and two atmospheric ports 182 and 184. When the carriage 150 is in its center neutral position, the supply port 176 is sealed off and the locking and unlocking ports are both vented to atmosphere. Movement of the carriage downwardly upon evacuation of the locking side of the actuator 30 provides communication between the supply port 176 and the locking port 178, while at the same time the unlocking port 180 remains vented to atmosphere. Movement of the carriage upwardly provides communication between the supply port 176 and the unlocking port 180 while the locking port remains vented to atmosphere. Momentary operation of either manual selector device will cause immediate operation of the actuating device 30 and move the carriage of the remote control valve to locking or unlocking position as selected. Even if the manual selector device is released and returns to neutral position after only momentary finger pressure is applied, a dashpot effect is achieved by the actuator 30 to permit the vacuum to be applied long enough to exhaust the relatively long lines leading to each door of the automobile. Once the diaphragm 142 has been pulled either to locking or unlocking position, it returns slowly under the force of the spring 174 as controlled by one of the small atmospheric bleeder ports 146 or 148 as the case may be. This slow action or dashpot effect provides sufficient time to exhaust the supply lines leading to the doors.

The operating devices 48, 50, 52, and 54 all are similar to each other and are generally similar to the actuating device 30 except that the operating devices are not provided with atmospheric bleeder ports. Referring to FIG. 18, the door operating device 48 comprises a housing 190 divided by a flexible diaphragm 192 into a locking chamber 194 and an unlocking chamber 196. The rod 48a is mechanically connected to the diaphragm 192 and projects out of the housing 190 through a sealing member 198. The locking chamber 194 is connected to the locking line 62 and the unlocking chamber 196 is connected to the unlocking line 72. When no vacuum is applied to the operating devices, the door locks are subject to individual manual control through the garnish molding button or the outside key since the locking member diaphragms are flexible enough to be moved upon the application of normal door locking force. Of course, if vacuum is applied to maintain the doors locked, there can be no manual control of the individual latches.

In operation of the system, when the automobile engine is started, a vacuum is drawn in the line 24 which comprises part of the fluid control circuit. However, normally both the shift valve 26 and the seat valve 28 are closed so that no vacuum is applied to the locking side of the actuating device 30. When the driver's seat is occupied, the valve 28 is opened, and when the transmission selector lever is placed in drive position, the valve 26 is opened, thus providing communication between the locking side of the actuating device 30 and the engine manifold, pulling the diaphragm 142 down and operating the remote control valve 56 in a locking direction so that a fluid supply circuit is opened from the vacuum storage tank 25 through lines 42 and 58 to the remote control valve 56 and from the locking side of the remote control valve to line 60 and thence to the locking side of each of the lock operators 48, 50, 52, and 54. As shown in FIG. 3, the rods 48a, 50a, 52a, 54a of the operating devices are each connected to the locking lever of a door latch so that each door latch is put in locked condition. So long as the engine remains running, the transmission selector lever remains in a drive position and the driver's seat remains occupied, vacuum is applied to the operating members and the doors remain locked and cannot be manually individually unlocked.

If the engine is turned off, if the transmission selector is taken out of drive, or if the driver gets out of the driver's seat, the automatic locking circuit is broken. Each latch may now be individually manually operated between locked and unlocked position in conventional and well known manner. Furthermore, when the automatic system is off, the manual selector units 32, 34 may be used to control the door locks coincidentally. Momentary operation of either of the manual selector devices 32, 34 will operate the actuating device 30 in an unlocking or locking direction as selected, moving the remote control valve to apply vacuum through the supply circuit to the operating devices 48, 50, 52, and 54. As pointed out above, the dashpot effect achieved by the actuating device 30 assures that vacuum will be drawn through the fluid supply circuit for a long enough time to exhaust the relay supply lines to the doors, even though the manual selector devices 32, 34 were only momentarily operated.

While we have shown and described one embodiment of our invention, it is capable of many modifications. Changes, therefore, in the construction and arrangement may be made without departing from the spirit and scope of the invention as set forth in the appended claims.

We claim:

1. In a fluid-operated door locking system for automatically and manually operating a door latch comprising, a fluid source, a reservoir for said fluid, fluid controlled operating means connected with said door latch, a fluid supply circuit for connecting said reservoir to said operating means, said fluid supply circuit including a remote control means for directing fluid from said reservoir to said operating means for locking and unlocking said latch, said remote control means including delay means for maintaining fluid communication beteween said reservoir and said operating means for a predetermined time interval, a valve in said fluid circuit interposed between said fluid source and said remote control means, said valve associated with a transmission selector and adapted upon movement of the latter into a drive position to direct fluid from said source to said remote control means to energize said delay means for locking said latch, and a manually operable valve located in said circuit between said reservoir and said remote control means and adapted upon momentary actuation to energize said delay means whereby sufficient fluid is admitted from said reservoir to said latch operating means to lock or unlock said door latch.

2. In a fluid-operated door locking system for automatically and manually operating a door latch comprising, a fluid source, a reservoir for said fluid, fluid controlled operating means connected with said door latch, a fluid supply circuit for connecting said reservoir to said operating means, said fluid supply circuit including a remote control means having a fluid-operated delay means for maintaining fluid communication between said reservoir and said operating means for a predetermined time interval, a control valve connected with said delay means and adapted to direct fluid from said reservoir to said operating means for locking and unlocking said latch, a valve in said fluid circuit interposed between said fluid source and said remote control means, said valve associated with a transmission selector and adapted upon movement of the latter into a drive position to direct fluid from said source to said remote control means to energize said delay means for locking said latch, and a manually operable valve located in said circuit between said reservoir and said remote control means and adapted upon momentary actuation to energize said delay means whereby sufficient fluid is admitted to said latch operating means from said reservoir to lock or unlock said door latch.

3. In a fluid-operated door locking system for autimatically and manually operating a door latch comprising, a fluid source, a reservoir for said fluid, fluid-controlled operating means connected with said door latch and adapted upon receipt of fluid to lock and unlock said door latch, a fluid supply circuit for connecting said reservoir to said operating means, said fluid supply circuit including a remote control means having a control valve, said control valve adapted to direct fluid from said reservoir to said operating means for locking and unlocking said latch, fluid-operated delay means connected with said control valve and having means for maintaining said control valve in a position to direct fluid to said operating means for a predetermined time interval, a valve in said fluid circuit interposed between said fluid source and said remote control means, said valve associated with a transmission selector and adapted upon movement of the latter into a drive position to automatically direct fluid from said source to said actuating means to energize the control valve for locking said latch, and a manually operable valve located in said circuit between said reservoir and said delay means for energizing the latter whereby sufficient fluid is admitted to said latch operating means from said reservoir to lock or unlock said door latch upon momentary actuation of said manually operable valve.

4. Apparatus of the character claimed in claim 3, wherein said remote control means includes a spring for returning said control valve from a fluid-directing position to a non-fluid-directing position.

References Cited in the file of this patent
UNITED STATES PATENTS

| | | |
|---|---|---|
| 2,169,268 | McCullough | Aug. 15, 1939 |
| 2,198,862 | Chesler | Apr. 30, 1940 |
| 2,344,826 | Le Gresley | Mar. 21, 1944 |
| 2,717,169 | Lindbloom | Sept. 6, 1955 |
| 2,740,947 | Davies | Apr. 3, 1956 |
| 2,901,053 | Lassiter | Aug. 25, 1959 |

OTHER REFERENCES

"Cadillac's 1956 Eldorado Brougham," article in "Mechanical Engineering" magazine of March 1956, page 260.